US010566890B2

(12) United States Patent
Yeh

(10) Patent No.: US 10,566,890 B2
(45) Date of Patent: Feb. 18, 2020

(54) COMPLEX REGULATOR

(71) Applicant: Jason Toys & Electronics Co., LTD, New Taipei (TW)

(72) Inventor: Shi-Tang Yeh, New Taipei (TW)

(73) Assignee: Jason Toys & Electronics Co., Ltd., New Taipei (TW)

( * ) Notice: Subject to any disclaimer, the term of this patent is extended or adjusted under 35 U.S.C. 154(b) by 176 days.

(21) Appl. No.: 15/960,471

(22) Filed: Apr. 23, 2018

(65) Prior Publication Data

US 2019/0165663 A1 May 30, 2019

(30) Foreign Application Priority Data

Nov. 29, 2017 (TW) .............................. 106141683 A

(51) Int. Cl.
| | |
|---|---|
| *H02M 1/00* | (2006.01) |
| *B60R 16/03* | (2006.01) |
| *G05F 1/625* | (2006.01) |
| *H02M 1/32* | (2007.01) |
| *H02M 1/44* | (2007.01) |
| *H02J 7/00* | (2006.01) |
| *H02J 1/10* | (2006.01) |
| *H02M 1/36* | (2007.01) |

(52) U.S. Cl.
CPC .............. *H02M 1/00* (2013.01); *G05F 1/625* (2013.01); *H02J 1/108* (2013.01); *H02J 7/0003* (2013.01); *H02J 7/0054* (2013.01); *H02M 1/32* (2013.01); *H02M 1/44* (2013.01); *B60R 16/03* (2013.01); *H02J 7/0065* (2013.01); *H02M 1/36* (2013.01); *H02M 2001/0045* (2013.01)

(58) Field of Classification Search
CPC ............ H02M 1/00; H02M 1/32; H02M 1/44; H02M 1/36; H02M 2001/0045; H02J 1/108; H02J 7/0003; H02J 7/0054; H02J 7/0065; G05F 1/625; B60R 16/03
See application file for complete search history.

(56) References Cited

U.S. PATENT DOCUMENTS

| | | | |
|---|---|---|---|
| 6,198,262 B1* | 3/2001 | Squibb | G05F 1/575 323/273 |
| 2007/0218324 A1* | 9/2007 | Tung | H01M 16/006 429/432 |

(Continued)

*Primary Examiner* — Rexford N Barnie
*Assistant Examiner* — Thai H Tran
(74) *Attorney, Agent, or Firm* — Wang Law Firm, Inc.

(57) ABSTRACT

A complex regulator of a remote-controlled car or remote-controlled boat includes a power input terminal, a power output terminal, a switch regulator, and a linear regulator. The switch regulator and the linear regulator are both connected between the power input terminal and the power output terminal and regulates the input voltage after which the input voltage is conveyed to the power output terminal. The switch regulator and the linear regulator have different operational conditions. When the remote-controlled car or remote-controlled boat is operated under a heavy load condition and the input voltage is consequently reduced to a level lower than the first threshold voltage and higher than the second threshold voltage, the switch regulator stops regulating the input voltage and the linear regulator continues regulating the input voltage to maintain the operation of the controller of the remote controlled car or boat.

10 Claims, 5 Drawing Sheets

(56) References Cited

U.S. PATENT DOCUMENTS

2009/0072626 A1\* 3/2009 Watanabe ........... H02M 3/1588
                                                    307/85
2009/0261796 A1\* 10/2009 Ito .......................... B60R 16/03
                                                    323/285

\* cited by examiner

COMPLEX REGULATOR

CROSS-REFERENCE TO RELATED APPLICATION

This application claims priority from Taiwan Patent Application No. 106141683, filed on Nov. 29, 2017 at the Taiwan Intellectual Property Office, the content of which is hereby incorporated by reference in its entirety for all purposes.

BACKGROUND OF THE INVENTION

1. Field of the Invention

The present invention relates to a voltage regulator and especially relates to a complex regulator for a remote-controlled car or a remote-controlled boat.

2. Description of the Related Art

Electronic devices such as remote-controlled cars and remote controlled-boats are ubiquitously used nowadays due to the advancement of present-day technology. These types of electronic devices have specific demands on their power and therefore require a regulator to adjust the voltage to meet their specifications. Two commonly known regulators are the switch regulator and the linear regulator. The linear regulator linearly adjusts the voltage with its simple circuit and has the advantages of a low working voltage and fast response, but, when the input voltage is greater than the output voltage, it easily heats up, thereby limiting its application. The switch regulator does not heat up easily when the input voltage is greater than the output voltage, but has shortcomings of a high working voltage and a delayed response. Regulators are chosen for specific devices according to the specific voltage demands. As for the remote-controlled car and boat, quick switches from high to low power are required in the situations of instantaneous forward acceleration or stopping. The aforementioned two kinds of regulators can hardly meet these needs without additional circuits, which results in a production cost increase.

In view of the aforementioned points, the inventor of the present invention has conceived and designed a complex regulator to ameliorate the shortcomings of the current voltage regulator techniques and to improve their industrial practical applicability.

SUMMARY OF THE INVENTION

In view of the aforementioned commonly known issues, the purpose of the present invention is to provide a complex regulator to solve the problems found in the conventional techniques.

For that purpose, the present invention provides a complex regulator, which includes a power input terminal, a power output terminal, a switch regulator, a linear regulator, a first diode, and a second diode and is applicable to a remote-controlled car or a remote-controlled boat that is powered by a battery. The remote-controlled car or the remote-controlled boat includes a controller and a power output system. The power input terminal is connected to the battery to receive the input voltage, and the power output terminal provides the controller with an output voltage, which is the input voltage after being regulated. It is necessary to understand that an input voltage becomes an output voltage after regulated by a regulator. The switch regulator and the linear regulator are both connected between the power input terminal and the power output terminal. When the input voltage arrives at the first threshold voltage, the switch regulator regulates the input voltage and conveys the first output voltage to the power output terminal, and when the input voltage arrives at the second threshold voltage, the linear regulator regulates the input voltage and conveys the second output voltage to the power output terminal, wherein the second threshold voltage is less than the first threshold voltage. The first diode is disposed between the switch regulator and the power output terminal, and the second diode is disposed between the linear regulator and the power output terminal. When the remote-controlled car or the remote-controlled boat is operated under the heavy load condition and the input voltage provided by the battery is consequently reduced to a level lower than the first threshold voltage and higher than the second threshold voltage, the switch regulator stops regulating the input voltage, and the linear regulator continues regulating the input voltage and providing the output to at least maintain the operation of the controller and to continue powering the remote-controlled car or the remote-controlled boat without causing a power interruption or a reset.

Preferably, when the remote-controlled car or the remote-controlled boat recovers from the heavy load condition to a normal operation condition, the input voltage is raised to a level higher than the first threshold voltage, and the switch regulator and the linear regulator both regulate the input voltage, and the first output voltage is greater than the second output voltage.

Preferably, when the input voltage is higher than the first threshold voltage, the switch regulator regulates the input voltage and outputs the first output voltage, and the linear regulator regulates the input voltage and outputs the second output voltage. The first output voltage is greater than the second output voltage.

Preferably, the switch regulator and the linear regulator are connected between the power input terminal and the power output terminal in parallel.

Preferably, a first voltage dividing circuit is disposed between the switch regulator and the power output terminal, and a second voltage dividing circuit is disposed between the linear regulator and the power output terminal. The first voltage dividing circuit and the second voltage dividing circuit adjust the first output voltage and the second output voltage.

Preferably, the first input capacitor is disposed between the switch regulator and the power input terminal for filtering the input voltage. Or the second input capacitor is disposed between the linear regulator and the power input terminal for filtering the input voltage. Both of the first input capacitor and the second input capacitor are to reduce noise interference.

Preferably, the first output capacitor is disposed between the switch regulator and the power output terminal for filtering the first output voltage. Or the second output capacitor is disposed between the linear regulator and the power output terminal for filtering the second output voltage. Both of the first output capacitor and the second output capacitor are to reduce noise interference.

Preferably, the first diode is forwardly disposed between the switch regulator and the power output terminal to prevent the second output voltage of the linear regulator from flowing back to the switch regulator and to protect the switch regulator.

Preferably, the second diode is forwardly disposed between the linear regulator and the power output terminal to prevent the first output voltage of the switch regulator from flowing back to the linear regulator and to protect the linear regulator.

Preferably, the voltage of the first output voltage after passing through the first diode is greater than the voltage of the second output voltage after passing through the second diode.

In summary, the complex regulator of the present invention can provide one or more of the following advantages.

(1) In the complex regulator of the present invention, the linear regulator continues regulating the input voltage to persistently power the remote-controlled car or the remote-controlled boat to prevent it from stopping or resetting even when the power output system of the remote-controlled car or the remote-controlled boat is operated in a heavy load condition.

(2) The complex regulator of the present invention further includes the first input capacitor or the second input capacitor and the first output capacitor or the second output capacitor for filtering the input voltage and the output voltage, thereby reducing noise.

(3) The complex regulator of the present invention further includes the first diode and the second diode to prevent the first output voltage and the second output voltage from flowing back, thereby providing protections for the switch regulator and the linear regulator.

DESCRIPTION OF THE PREFERRED EMBODIMENTS

For easier comprehension of its advantages, features, and approaches, the present invention will be described in detail by embodiments with their corresponding figures. The present invention can also be implemented in different ways and should not be considered limited by these embodiments. For one skilled in the art, the scope of the present invention can be more clearly, thoroughly, and completely delivered through these provided embodiments and is, however, defined solely by the appended claims.

Figure 1:
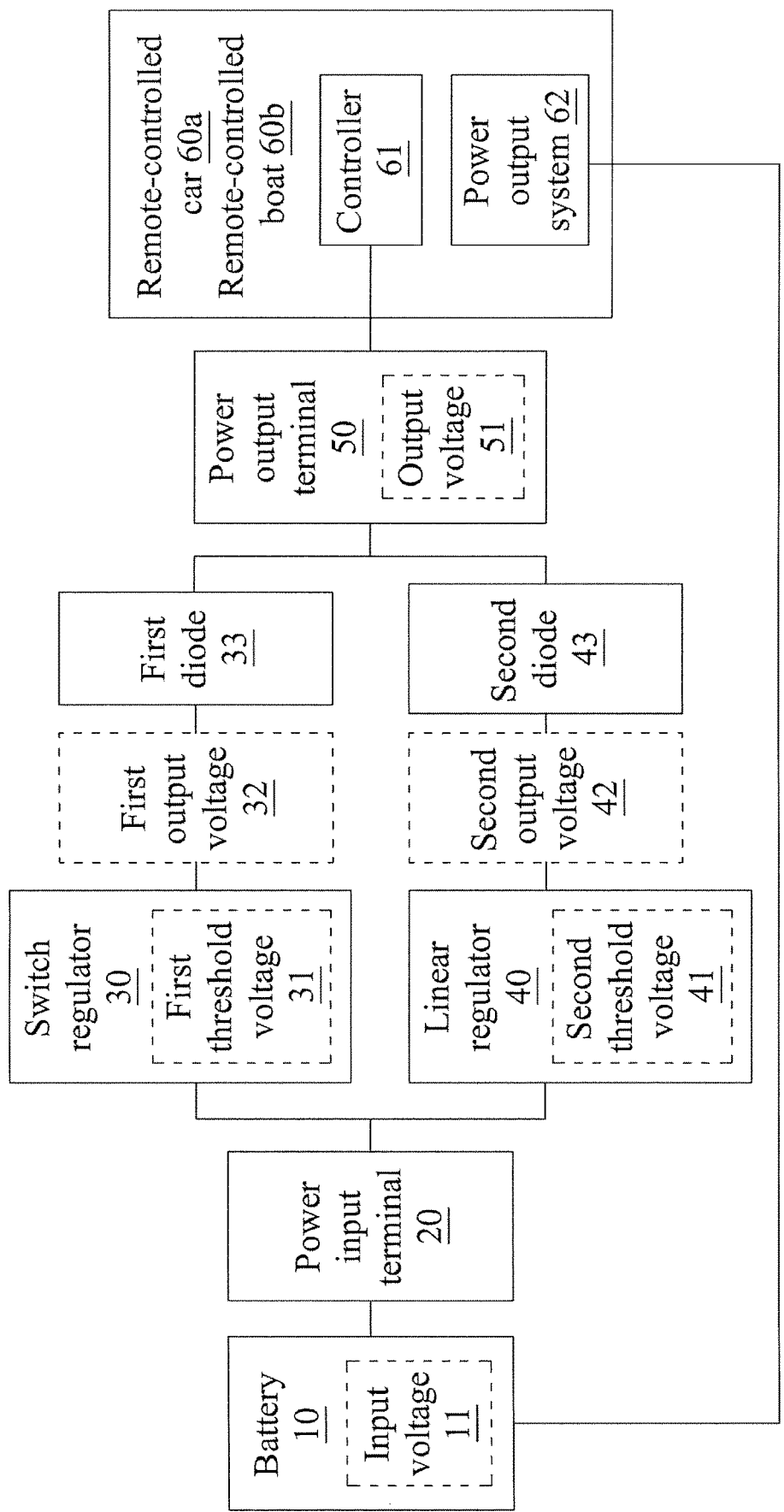
FIG. 1 is a block diagram showing the first embodiment of a complex regulator of the present invention.

The following refers to FIG. 1, which is a block diagram showing the first embodiment of a complex regulator of the present invention. In this embodiment, the present invention provides a complex regulator including: a battery 10, a power input terminal 20, a switch regulator 30, a linear regulator 40, a first diode 33, a second diode 43, and a power output terminal 50. The complex regulator is applicable to a remote-controlled car 60a or a remote-controlled boat 60b which is powered by a battery 10. The remote-controlled car 60a or the remote-controlled boat 60b includes a controller 61 and a power output system 62. The power input terminal 20 is connected to the battery 10 to receive an input voltage 11. The power output terminal 50 provides the controller 61 with an output voltage 51, which is the input voltage 11 after being regulated. The switch regulator 30 and the linear regulator 40 are both connected in parallel between the power input terminal 20 and the power output terminal 50. When the input voltage 11 arrives at the first threshold voltage 31, the switch regulator 30 regulates the input voltage 11 and conveys the first output voltage 32 to the power output terminal 50, and when the input voltage 11 arrives at the second threshold voltage 41, the linear regulator 40 regulates the input voltage 11 and conveys the second output voltage 42 to the power output terminal 50, wherein the second threshold voltage 41 is less than the first threshold voltage 31. The first diode 33 is disposed between the switch regulator 30 and the power output terminal 50, and the second diode 43 is disposed between the linear regulator 40 and the power output terminal 50. When the power output system 62 of the remote controlled car 60a or the remote controlled-boat 60b is operated under a heavy load condition and the input voltage 11 provided by the battery 10 is consequently reduced to a level lower than the first threshold voltage 31 and higher than the second threshold voltage 41, the switch regulator 30 stops regulating the input voltage 11, and the linear regulator 40 continues regulating the input voltage 11 to at least maintain the operation of the controller 61 and to continue powering the remote-controlled car 60a or the remote controlled-boat 60b without causing a power interruption or a reset. In addition, the battery 10 can be a nickel-metal-hydride battery, a lead-acid battery, or any other available battery type.

Figure 2:
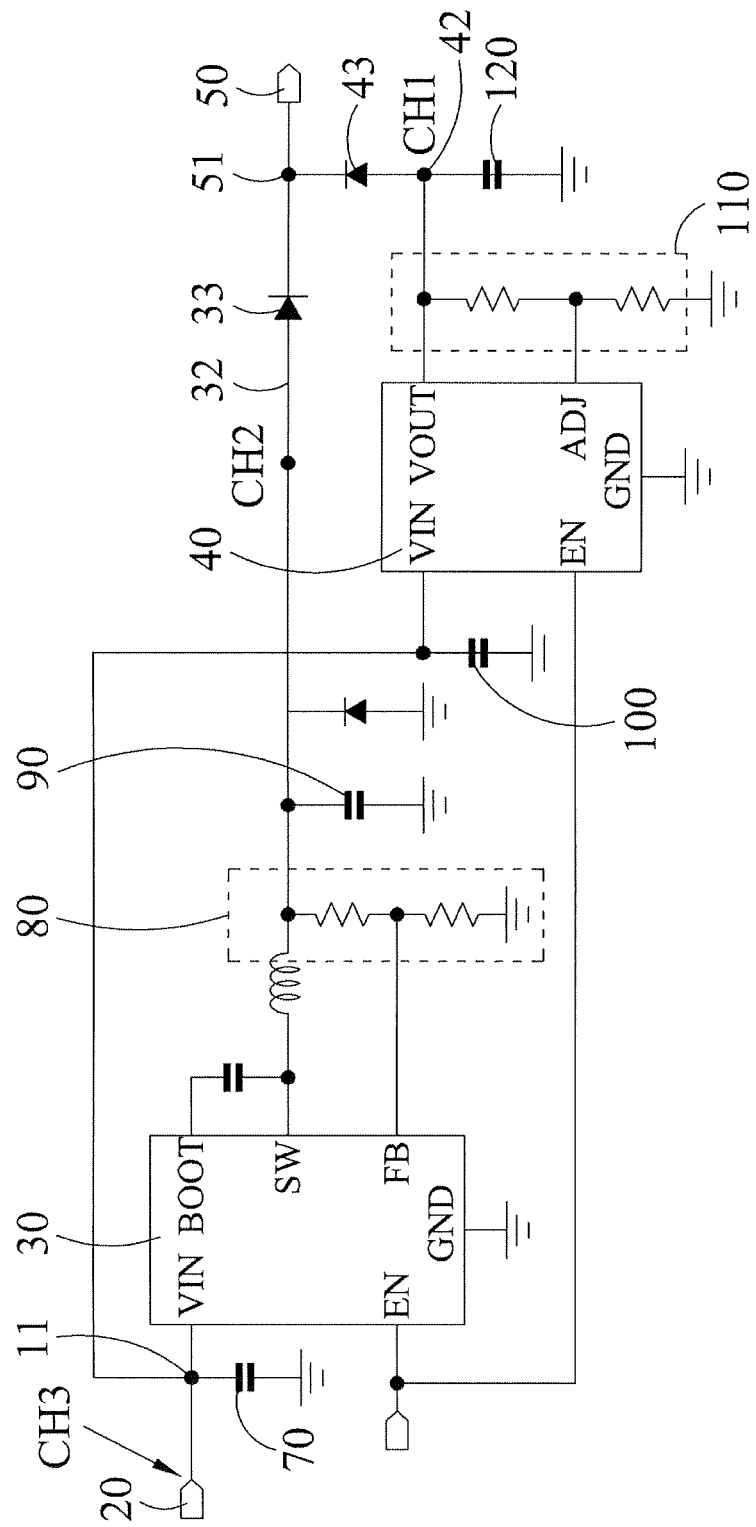
FIG. 2 is a circuit diagram showing the first embodiment of a complex regulator of the present invention.

The following refers to FIG. 2, which is a circuit diagram showing the first embodiment of a complex regulator of the present invention. As shown in FIG. 2, the first diode 33 and the second diode 43 are forwardly disposed between the switch regulator 30 and the power output terminal 50 and between the linear regulator 40 and the power output terminal 50, respectively, to prevent the second output voltage 42 and the first output voltage 32 from flowing back to the switch regulator 30 and the linear regulator 40, thereby providing protection for the switch regulator 30 and the linear regulator 40.

Preferably, there is a first voltage dividing circuit 80 disposed between the switch regulator 30 and the power output terminal 50 and a second voltage dividing circuit 110 disposed between the linear regulator 40 and the power output terminal 50 to adjust the first output voltage 32 and the second output voltage 42 according to the voltage demands and therefore to adjust the value of the output voltage 51 so that the remote-controlled car 60a or the remote-controlled boat 60b is able to function normally. In addition, a first input capacitor 70 is disposed between the switch regulator 30 and the power input terminal 20 for filtering the input voltage 11, and a second input capacitor 100 is disposed between the linear regulator 40 and the power input terminal 20 for filtering the input voltage 11. A first output capacitor 90 is disposed between the switch regulator 30 and the power output terminal 50 for filtering the first output voltage 32, and a second output capacitor 120 is disposed between the linear regulator 40 and the power output terminal 50 for filtering the second output voltage 42. As a result, first output capacitor 90, and second output capacitor 120 effectively reduce noise interference.

Figure 3:
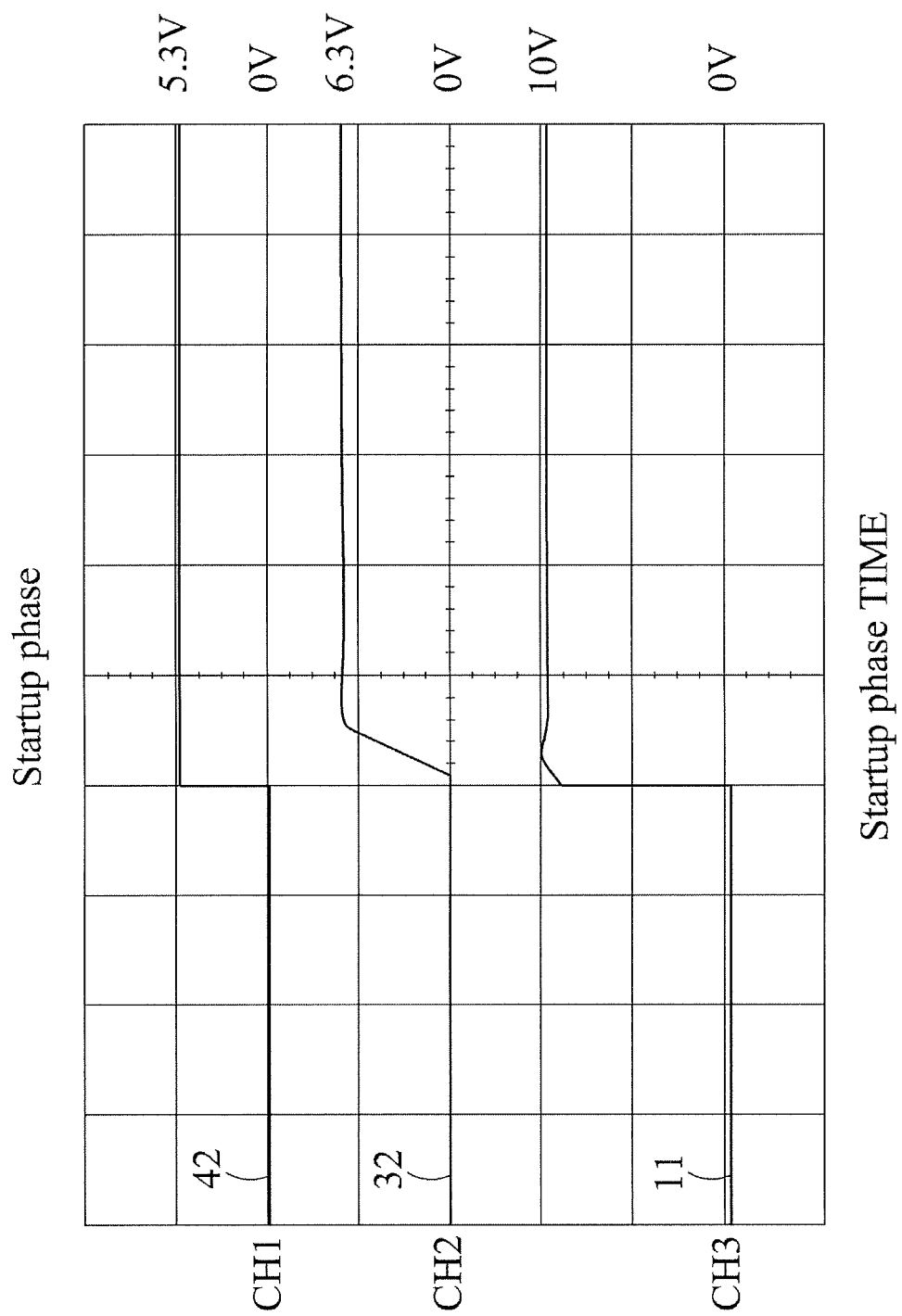
FIG. 3 is an oscillogram showing a battery input and a regulated output vs. time during a startup phase in the first embodiment of a complex regulator in the present invention.
Figure 4:
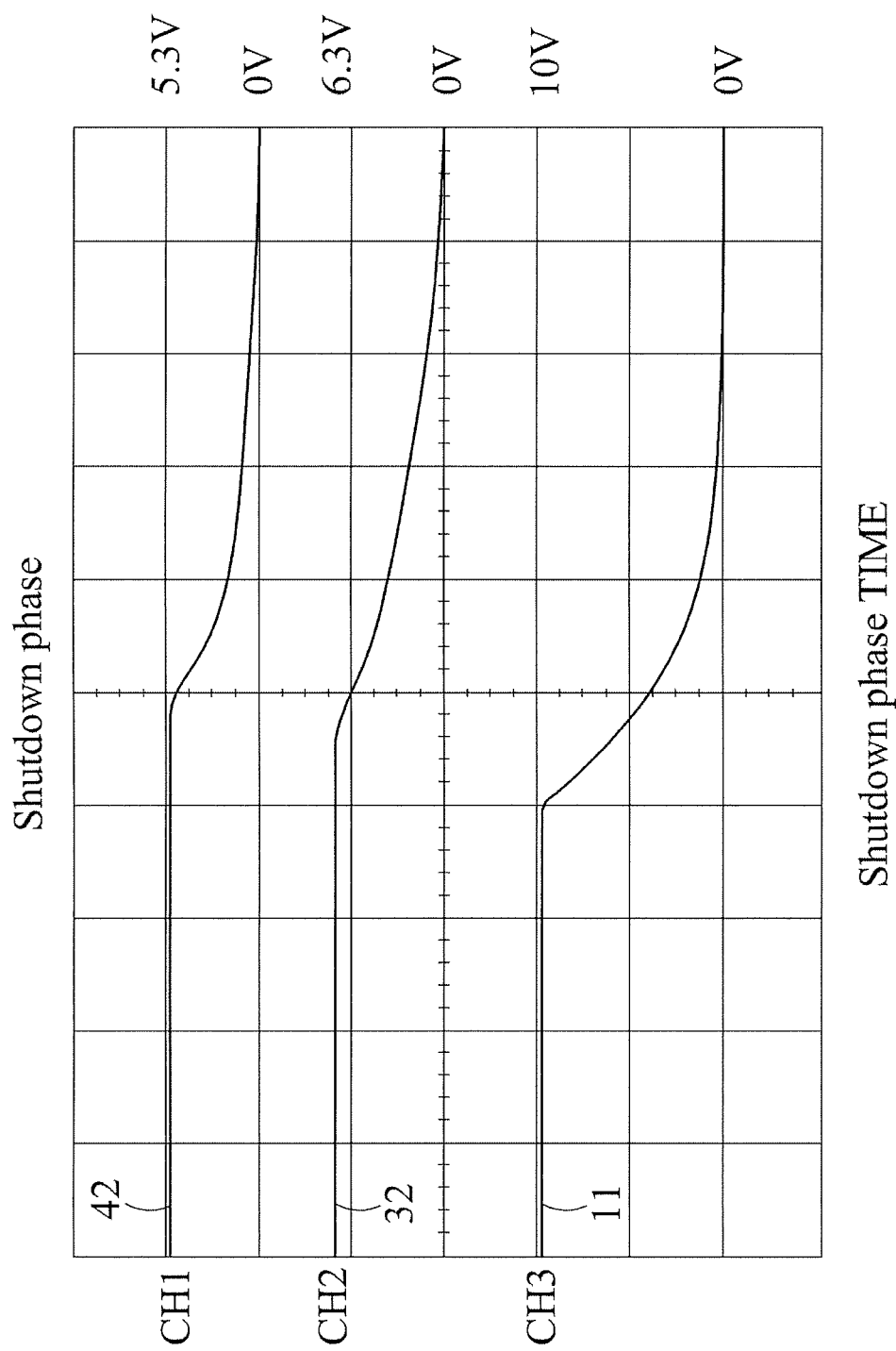
FIG. 4 is an oscillogram showing a battery input and a regulated output vs. time during a shutdown phase in the first embodiment of a complex regulator in the present invention.
Figure 5:
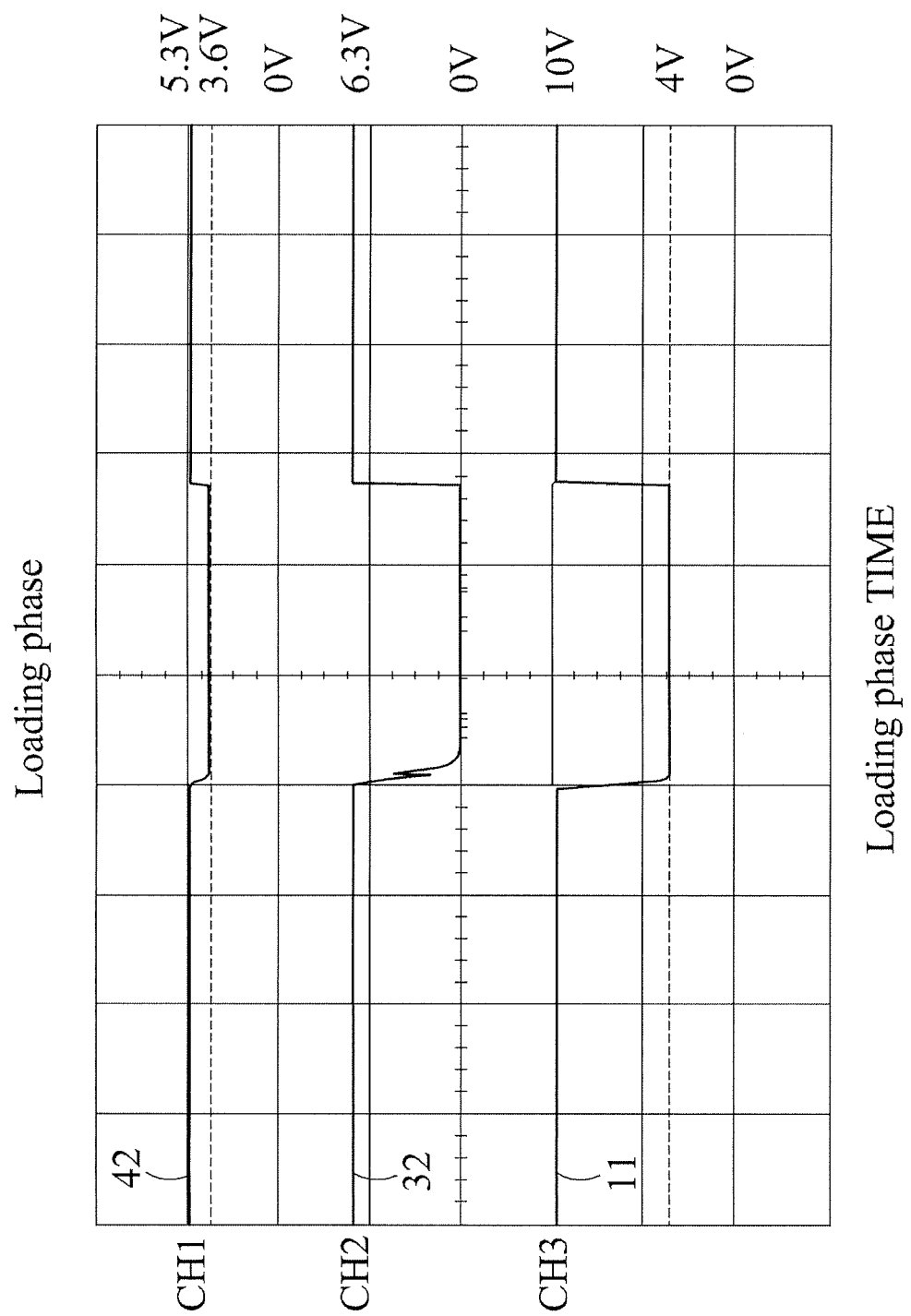
FIG. 5 is an oscillogram showing a battery input and a regulated output vs. time during a loading phase in the first embodiment of a complex regulator in the present invention.

The following refers to FIGS. 3 to 5, which respectively are an oscillogram showing a startup phase in the first embodiment of a complex regulator in the present invention, an oscillogram showing a shutdown phase in the first embodiment of a complex regulator in the present invention, and an oscillogram showing a loading phase in the first embodiment of a complex regulator in the present invention.

Firstly, measuring points CH1, CH2, CH3 are set up as in FIG. 2, wherein the measuring point CH1 is configured to measure the second output voltage 42, and the measuring point CH2 is configured to measure the first output voltage 32, and the measuring point CH3 is configured to measure the input voltage 11. Also with reference to FIGS. 3 and 4, the startup, shutdown, and loading phases of inputting the input voltage 11 into the power input terminal 20 are illustrated. (1) As shown in FIG. 3 with the aid of FIG. 2 for the illustration, the battery 10 provides the input voltage 11 to the power input terminal 20, and the power input terminal 20 delivers the input voltage 11 respectively to the switch regulator 30 and the linear regulator 40, and the switch regulator 30 and the linear regulator 40 both regulate the input voltage 11 and then respectively output the first output voltage 32 and the second output voltage 42. (2) As shown in FIG. 4 with the aid of FIG. 2 for the illustration, the battery 10 stops providing the input voltage 11 to the power input terminal 20, and the switch regulator 30 and the linear regulator 40 both do not receive the input voltage 11, and therefore there is no first output voltage 32 and second output voltage 42. The voltage at CH1 and CH2 are both zero as shown in the figure.

The following refers to the loading phase in FIG. 5. With the aid of FIG. 2, the figures illustrate the following situations of a remote-controlled car 60a or a remote-controlled boat 60b receiving the input voltage 11: (1) CH1 is lowered from 5.3V to 3.6V, and CH2 is lowered from 6.3V to 0V, and CH3 is lowered from 10V to 4V. In this situation, the power output system 62 of the remote-controlled car 60a or the remote-controlled boat 60b is under a heavy load condition, which results in the lowering of the battery 10 provided input voltage 11 to a level less than the first threshold voltage 31 and higher than the second threshold voltage 41 and the reaching of the lowest working voltage of the switch regulator 30, so that the switch regulator 30 stops regulating the input voltage 11, but the linear regulator 40 continues regulating the input voltage 11 to at least maintain the operation of the controller 61 without causing a reset and power interruption to the remote-controlled car 60a or the remote-controlled boat 60b. (2) CH1 is raised from 3.6V to 5.3V, and CH2 is raised from 0V to 6.3V, and CH3 is raised from 0V to 10y. In this phase, the power output system 62 of the remote controlled car 60a or the remote-controlled boat 60b recovers from a heavy load condition to a normal operation condition. The input voltage 11 is raised to a level higher than the first threshold voltage 31, which means the input voltage 11 is raised to a level higher than the minimum working voltage of the switch regulator 30, and the switch regulator 30 and the linear regulator 40 both regulate the input voltage 11. The first output voltage 32 is greater than the second output voltage 42, and the voltage of the first output voltage 32 after passing through the first diode 33 is still greater than the voltage of the second output voltage 42 after passing through the second diode 43. In this case, the configurations of the first diode 33 and the second diode 43 do not change the status quo that the first output voltage 32 is higher than the second output voltage 42. (3) CH1 is maintained at 5.3V, and CH2 is maintained at 6.3V, and CH3 is maintained at 10V. In this phase, the input voltage 11 is maintained at a level higher than the first threshold voltage 31. The switch regulator 30 regulates the input voltage 11 and outputs the first output voltage 32, and the linear regulator 40 regulates the input voltage 11 and outputs the second output voltage 42, wherein the first output voltage 32 is still greater than the second output voltage 42 to maintain a normal operation of the remote-controlled car 60a or the remote-controlled boat 60b.

In summary, adopting the combination of the switch regulator 30 and the linear regulator 40, the complex regulator of the present invention can continuously power the power output system 62 of a remote controlled car 60a or a remote-controlled boat 60b under a heavy load condition with the second output voltage 42 provided by the linear regulator 40 to maintain a normal operation of the controller 61 so as to prevent the remote-controlled car 60a and the remote-controlled boat 60b from resetting. The additional first input capacitor 70 and the second input capacitor 100 filter the input voltage 11, and the additional first output capacitor 90 and second output capacitor 120 filter the first output voltage 32 and the second output voltage 42 in order to reduce the noise interference. The additional configurations of the first diode 33 and the second diode 43 protect the switch regulator 30 and the linear regulator 40 by preventing the first output voltage 32 and the second output voltage 42 from flowing in the reverse direction. Overall, the complex regulator of the present invention provides the aforementioned advantages of continuously powering the remote-controlled car 60a or the remote-controlled boat 60b to maintain its normal operation in all circumstances.

The description above is only for the purpose of illustration but not restriction. Without departing from the spirit of the present application, all equivalent modifications or alterations should be considered as falling within the protection scope of the appended claims.

What is claimed is:

1. A complex regulator of a remote controlled car or a remote-controlled boat powered by a battery, wherein the remote-controlled car or the remote-controlled boat comprises a controller and a power output system, the complex regulator comprising:

a power input terminal connected to the battery to receive an input voltage;

a power output terminal providing the controller with an output voltage, which is the input voltage after being regulated;

a switch regulator connecting the power input terminal to the power output terminal, wherein, when the input voltage arrives at a first threshold voltage, the switch regulator regulates the input voltage and conveys a first output voltage to the power output terminal;

a linear regulator connecting the power input terminal to the power output terminal, wherein, when the input voltage arrives at a second threshold voltage, the linear regulator regulates the input voltage and conveys a second output voltage to the power output terminal, wherein the second threshold voltage is less than the first threshold voltage;

a first diode disposed between the switch regulator and the power output terminal; and a second diode disposed between the linear regulator and the power output terminal;

wherein, when the power output system of the remote-controlled car or the remote-controlled boat is operated under a heavy load condition and the input voltage provided by the battery is consequently reduced to a level lower than the first threshold voltage and higher than the second threshold voltage, the switch regulator stops regulating the input voltage, and the linear regulator continues regulating the input voltage to maintain a normal operation of the controller without being reset by a power interruption.

2. The complex regulator of claim 1, wherein, when the power output system of the remote-controlled car or the remote-controlled boat recovers from the heavy load condition to a normal operation condition, the input voltage is raised to a level higher than the first threshold voltage, and the switch regulator and the linear regulator both regulate the input voltage, and the first output voltage is higher than the second output voltage.

3. The complex regulator of claim 1, wherein, when the input voltage is greater than the first threshold voltage, the switch regulator regulates the input voltage to the first output voltage, and the linear regulator regulates the input voltage to the second output voltage with the first output voltage being greater than the second output voltage.

4. The complex regulator of claim 1, wherein the switch regulator and the linear regulator are connected between the power input terminal and the power output terminal in parallel.

5. The complex regulator of claim 1, wherein a first voltage dividing circuit is disposed between the switch regulator and the power output terminal, and a second voltage dividing circuit is disposed between the linear regulator and the power output terminal to adjust the first output voltage and the second output voltage.

6. The complex regulator of claim 1, wherein a first input capacitor is disposed between the switch regulator and the power input terminal for filtering the input voltage, or a second input capacitor is disposed between the linear regulator and the power input terminal for filtering the input voltage.

7. The complex regulator of claim 1, wherein a first output capacitor is disposed between the switch regulator and the power output terminal for filtering the first output voltage, or a second output capacitor is disposed between the linear regulator and the power output terminal for filtering the second output voltage.

8. The complex regulator of claim 1, wherein the first diode is forwardly disposed between the switch regulator and the power output terminal to prevent the second output voltage of the linear regulator from flowing back to the switch regulator.

9. The complex regulator of claim 1, wherein the second diode is forwardly disposed between the linear regulator and the power output terminal to prevent the first output voltage of the switch regulator from flowing back to the linear regulator.

10. The complex regulator of claim 1, wherein a voltage of the first output voltage after passing through the first diode is greater than a voltage of the second output voltage after passing through the second diode.

* * * * *